(12) United States Patent
Kusano

(10) Patent No.: US 7,857,475 B2
(45) Date of Patent: Dec. 28, 2010

(54) DIRECT-TYPE BACKLIGHT DEVICE

(75) Inventor: Kenji Kusano, Tokyo (JP)

(73) Assignee: Zeon Corporation, Tokyo (JP)

( * ) Notice: Subject to any disclaimer, the term of this patent is extended or adjusted under 35 U.S.C. 154(b) by 146 days.

(21) Appl. No.: 12/375,910

(22) PCT Filed: Jul. 18, 2007

(86) PCT No.: PCT/JP2007/064147

§ 371 (c)(1),
(2), (4) Date: Jan. 30, 2009

(87) PCT Pub. No.: WO2008/015908

PCT Pub. Date: Feb. 7, 2008

(65) Prior Publication Data

US 2009/0268433 A1 Oct. 29, 2009

(30) Foreign Application Priority Data

Aug. 2, 2006 (JP) .............................. 2006-211276

(51) Int. Cl.
*G09F 13/04* (2006.01)
(52) U.S. Cl. ...................... 362/97.1; 362/225; 362/339; 362/331; 349/64
(58) Field of Classification Search ................ 362/97.1, 362/97.03, 613, 620, 330, 331, 337, 339, 362/217.05, 217, 7, 225; 349/64
See application file for complete search history.

(56) References Cited

U.S. PATENT DOCUMENTS 5,224,770 A * 7/1993 Simmons et al. .............. 362/29
5,390,276 A * 2/1995 Tai et al. ..................... 385/146
6,456,437 B1 * 9/2002 Lea et al. .................... 359/625
6,893,135 B2 * 5/2005 Wright et al. ................ 362/632
7,063,448 B2 * 6/2006 Kang et al. .................. 362/558
7,578,610 B2 * 8/2009 Sakamoto et al. ........... 362/634
2004/0090572 A1 5/2004 Han et al.

FOREIGN PATENT DOCUMENTS

| JP | 2001-202814 A | 7/2001 |
| JP | 2004-163945 A | 6/2004 |
| WO | WO-2006/022270 A1 | 3/2006 |

* cited by examiner

*Primary Examiner*—Ali Alavi
(74) *Attorney, Agent, or Firm*—Birch, Stewart, Kolasch & Birch, LLP

(57) ABSTRACT

Provided is a direct-type backlight device having a sufficient luminance in a front direction and capable of suppressing a luminance unevenness on a light emitting plane with a reduced electric power consumption. In the direct-type backlight device having linear light sources 2, a reflecting plate 3 and a light diffusing member 1, a distance (a) between centers of the adjacent two linear light sources is 30 to 65 mm. The light diffusing member 1 has an approximately flat light incident plane 1A and a light outgoing plane 1B on which multiple linear prisms 4 are aligned. The linear prism 4 has two inclined surfaces 4A having an approximately equal tilt angle against a plane which is perpendicular to a thickness direction of the light diffusing member 1. A relationship of $(a)/7 < L < (a)/4$ is satisfied wherein L is a distance (mm) between a central position S of one image in two images on the light outgoing plane corresponding to one linear light source and a position R at which a center of the one linear light source is projected on the light outgoing plane.

6 Claims, 2 Drawing Sheets

DIRECT-TYPE BACKLIGHT DEVICE

TECHNICAL FIELD

The present invention relates to a direct-type backlight device, and in particular relates to a direct-type backlight device having a sufficient luminance in a front direction and capable of suppressing a luminance unevenness on a light emitting plane.

BACKGROUND ART

As backlight devices for liquid crystal displays, edge-light type backlight devices and direct-type backlight devices have been conventionally used. The edge-light type backlight device is a system wherein a light source is disposed on a light incident edge at a side of an optical waveguide and a light entering from the light incident edge is reflected in the optical waveguide and emitted from a principal surface (light emitting plane) of the optical waveguide. Meanwhile, the direct-type backlight device is a system wherein a light source is disposed on a back surface of the light emitting plane on a light diffusing plate. A commonly used example of such a direct-type backlight device is the one having a plurality of linear light sources arranged in approximately parallel, a reflecting plate which reflects the light from these linear light sources, and a light diffusing member which receives, on a light incident plane thereof, direct light from the linear light sources and reflected light from the reflecting plate, wherein the light is then diffused and then goes out of the member from a light outgoing plane thereof which is an opposite surface of the light incident plane.

In such a direct-type backlight device, the linear light sources are disposed directly under the light diffusing member. Thus, there is a tendency of high luminance at a position directly above the linear light source, and the luminance tends to be reduced as distance from this directly-above position becomes longer. Such a tendency causes cyclic luminance unevenness on the light emitting plane. Thus, for example, Patent Document 1 discloses a direct-type backlight device having a predetermined prism row formed on a surface of the light diffusing plate, thereby having a high luminance and suppressed luminance unevenness. In Example in Patent Document 1, there is described an example wherein a reflecting plate having a flat reflecting plane was used and the distance between centers of the linear light sources was 25 mm.

Patent Document 1: International Publication No. WO2006/022270 Pamphlet

DISCLOSURE OF INVENTION

Problem to be Solved by the Invention

By the way, in recent years, there have been made attempts to decrease the number of the linear light sources in the direct-type backlight devices, i.e., to further increase the distance between the centers of the linear light sources, aiming at reduction of an electric power consumption. As a suitable reflecting plate in terms of easy molding, those having a flat reflecting plane are used. However, when the reflecting plate having the flat reflecting plane is used and the distance between the centers of the linear light sources is further increased, the cyclic luminance unevenness on the light emitting plane is undesirably increased.

It is an object of the present invention to provide a direct-type backlight device having a sufficient luminance in a front direction and a suppressed luminance unevenness on a light emitting plane as well as having a reduced electric power consumption.

Means for Solving Problem

As a result of an extensive study for solving the aforementioned problem, the present inventor has found that a sufficient luminance in a front direction and a suppressed luminance unevenness on a light emitting plane as well as a reduced electric power consumption can be achieved by making a distance (a) between centers of adjacent linear light sources 30 to 65 mm to decrease a number of the linear light sources and bringing an image of a certain linear light source into appearance at positions in particular regions, specifically not at positions having equal intervals but at positions shifted to a the position at which the linear light source is projected. The present inventor has thus completed the present invention based on this finding.

The present invention is a direct-type backlight device comprising: a plurality of linear light sources disposed in approximately parallel, a reflecting plate having a flat plane surface which reflects light from the linear light sources and a platy light diffusing member receiving, diffusing and emitting direct light from said linear light sources and reflected light from said reflecting plate, wherein a distance (a) between centers of the adjacent linear light sources of said plurality of linear light sources is 30 to 65 mm, wherein said light diffusing member comprises an approximately flat light incident plane on a surface facing said linear light sources and a light outgoing plane having a prism row of a plurality of aligned linear prisms extending in approximately parallel to a longitudinal direction of said linear light sources, wherein said linear prism has two inclined surfaces having an approximately equal tilt angle against a plane perpendicular to a thickness direction of the light diffusing member, and a cross sectional shape of the linear prism in a crosswise direction is a triangle, and wherein a relationship of $(a)/7 < L < (a)/4$ is satisfied wherein L is a distance (mm) between a central position of one image of two images on said light outgoing plane both corresponding to one linear light source among said plurality of linear light sources, and a position at which a center of said one linear light source is projected on said light outgoing plane.

"Two images on the light outgoing plane both corresponding to one linear light source" refer to images of the linear light source observed on the light diffusing member, when the observation of the light outgoing plane is performed from a light outgoing surface, at positions distant from the position directly above the linear light source (the position at which the linear light source image is projected on the light incident plane of the light diffusing plate: the original position of the linear light source), the distance being caused by the reflecting plate, the light diffusing member, etc. (such images may be referred to herein as "split images"). When the split image is not observed clearly, the position having high luminance when measured by a luminometer is the position of the split image.

Generally when the light diffusing plate having a linear prism having a triangle-shaped cross section is used, two split images per one linear light source are observed. In order to identify attribution of each split image to linear light source in this situation, a cover may be given to a certain linear light source. Observing the images on the light outgoing surface of the light diffusing plate, the split images which have now become unrecognizable may be specified.

Generally it is believed that the split images appearing at positions aligned with equal intervals one another is advantageous for reducing luminance unevenness on the light emitting plane. That is, it is believed that the luminance unevenness is maximally reduced when $L=(a)/4$. However, according to the present inventor, it has been surprisingly found out that the luminance unevenness on the light emitting plane can be reduced when the split image satisfies a "relationship of $(a)/7<L<(a)/4$" when the distance between the centers of the linear light sources is widened. In other words, the luminance unevenness on the light emitting plane can be reduced not when the split images appear at the positions aligned with equal intervals one another but when the split images appear at the position shifted to the position to which the linear light source is projected. Therefore, according to the present invention, the luminance unevenness on the light emitting plane can be reduced while a sufficient luminance can be obtained by bringing the split image into appearance at the position close to the position of the projected image of the corresponding linear light source. Furthermore, the number of the linear light sources to be used can be reduced by arranging the linear light sources with the distance therebetween (a) being 30 to 65 mm. Consequently, the electric power consumption of the direct-type backlight device can be reduced.

It is preferable that the distance between a central position of the linear light source and the light incident plane (b) (mm) satisfies the relationship of $1<(a)/(b)<3$. By such a constitution, it is possible to reduce the luminance unevenness without impairing light utilization efficiency.

It is preferable that the cross sectional shape in the crosswise direction of the linear prism is an isosceles triangle. Such a constitution renders relatively easy molding of the light diffusing member.

The light diffusing member may have a integrally molded constitution. The light diffusing member may be in a constitution comprising a light diffusing plate having approximately flat front and back surfaces and a prism sheet disposed on the front surface of this light diffusing plate, said prism sheet having said prism row formed on a surface opposite to a surface facing said front surface of said light diffusing plate. In this case, the light incident plane is the back surface of said light diffusing plate, and the light outgoing plane is the surface of said prism sheet on which said prism row is formed. In this embodiment, it is preferable that a total light transmittance of the light diffusing plate is 75% or more.

Effect of the Invention

The direct-type backlight device of the present invention is so arranged that the images of the linear light source appear at the position close to the position at which the linear light source is projected, whereby it is possible to have a sufficient luminance in the front direction and have a suppressed luminance unevenness as well, with a reduced electric power consumption.

Figure 1:
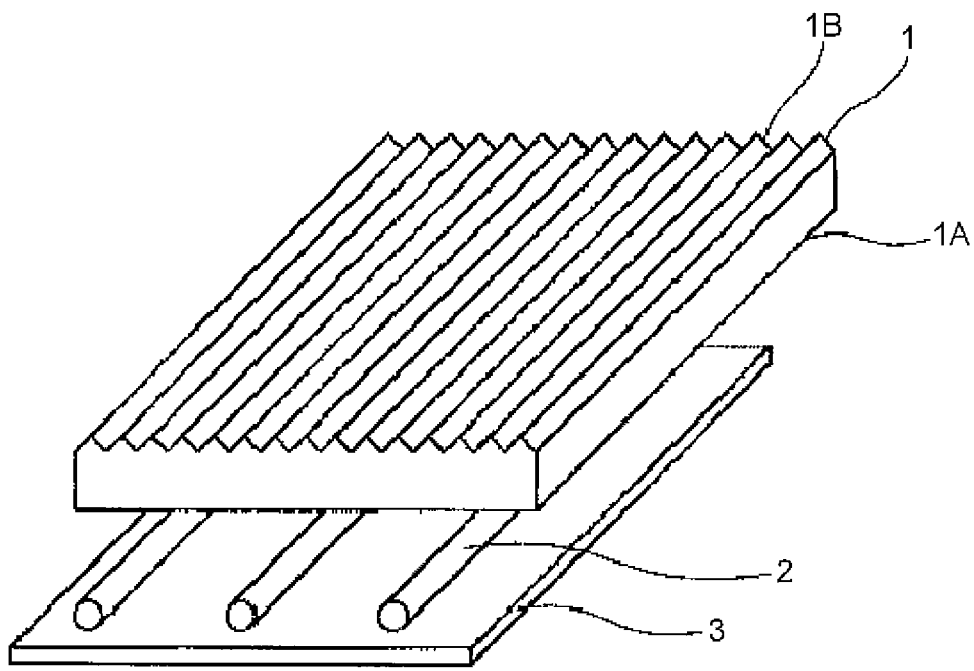
FIG. 1 is a perspective view schematically showing a direct-type backlight device according to the present invention.

EXPLANATION OF NUMERALS 1,11 Light diffusing plate (light diffusing member)
1A,11A Light incident plane
1B,12A Light outgoing plane
2 Linear light source
3 Reflecting plate
4 Linear prism
4A Inclined surface
5 Prism row
10 Light diffusing member
12 Prism sheet
a Distance between centers of adjacent linear light sources
b Distance between a central position of a linear light source and a light incident plane
L Distance between R and S
R Position at which a center of a linear light source is projected on a light outgoing plane
S Central position of an image corresponding to a linear light source on a light outgoing plane

BEST MODE FOR CARRYING OUT THE INVENTION

The direct-type backlight device according to embodiments of the present invention will be described with reference to the drawings.

FIG. 1 is a perspective view schematically showing the direct-type backlight device according to one embodiment of the present invention. The direct-type backlight device of the present embodiment comprises a plurality of linear light sources 2 disposed in approximately parallel, a reflecting plate 3 having a flat plane surface which reflects light from the linear light sources 2, and a light diffusing plate 1 which receives direct light from the linear light sources 2 and reflected light from the reflecting plate 3 on a light incident plane 1A, and diffuses and emits the light from a light outgoing plane 1B.

<Linear Light Source>

As the linear light source, it is possible to use a fluorescent lamp such as cold cathode tubes and hot cathode tubes which contain an electric discharge medium enclosed in a glass tube having an approximately circular cross section. The external diameter of the linear light source may be, for example, 2 to 20 mm. Examples of the external shape of the linear light source may include a U-shape wherein two tubes in parallel are connected via one piece of approximately semicircular tube to configure one tube, an N shape wherein three tubes in parallel are connected via two pieces of approximately semicircular tubes to configure one tube, and a W-shape wherein four tubes in parallel are connected via three pieces of approximately semicircular tubes to configure one tuber in addition to the linear shape.

The distance (a) between the centers of the adjacent linear light sources is preferably 33 to 60 mm. Adjusting the distance (a) between the centers within the aforementioned range, it is possible to achieve a sufficient luminance and reduced electric power consumption of the direct-type backlight device.

The number of the linear light sources is not particularly limited. For example, when the direct-type backlight device of the present invention is used for a 32-inch liquid crystal display device, the number of the linear light sources may be an even number such as 12, 10, 8 and 6 or an odd number. The size of the direct-type backlight device is not limited to the aforementioned 32-inch size.

<Reflecting Plate>

The reflecting plate has a front surface (surface facing the linear light sources) which is formed as a flat surface. The flat surface means a surface having no particular concavo-convex shape and having a mean line average roughness Ra in the range of 0.001 to 10 μm. As a material for the reflecting plate, white- or silver-colored resins and metals may be used, and the resin is preferable in terms of light weight. Preferable color of the reflecting plate is white because a uniformity ratio of luminance may be enhanced thereby. However, white and silver may be mixed in order to highly balance the luminance and the uniformity ratio of luminance.

Light Diffusing Member>

Examples of the light diffusing member for the direct-type backlight device according to the present invention may include the following two embodiments.

First Embodiment

Figure 2:
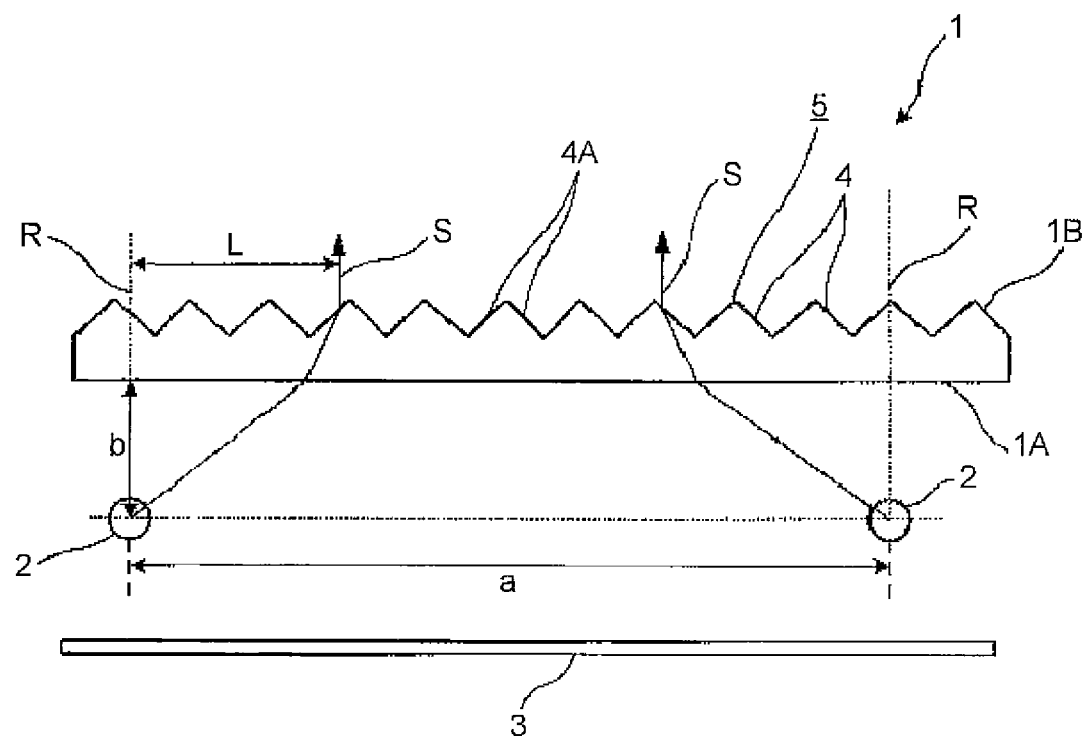
FIG. 2 is a vertical cross sectional view schematically showing a direct-type backlight device according to a first embodiment of the present invention.

FIG. 2 is a cross sectional view showing a first embodiment of the light diffusing member for the direct-type backlight device of the present invention. As shown in FIG. 2, the light diffusing member according to the first embodiment may be a light diffusing plate 1 comprising an approximately flat light incident plane 1A which faces the linear light sources 2, and a light outgoing plane 1B having a prism row 5 wherein multiple linear prisms 4 extending in approximately parallel to a longitudinal direction of the linear light sources 2 are aligned. The linear prism 4 has two inclined surfaces 4A having an approximately equal tilt angle against a plane which is perpendicular to a thickness direction of the light diffusing member, and the cross sectional shape in the crosswise direction of the linear prism 4 is a triangle shape. As shown in FIG. 2, the light diffusing plate 1 in the present embodiment is constituted so that the relationship of (a)/7<L<(a)/4 is satisfied wherein L is a distance (mm) between a central position S of one image in two images on the light outgoing plane both corresponding to one linear light source among the plurality of linear light sources, and a position R at which a center of the one linear light source is projected on the light outgoing plane. Such a light diffusing plate is integrally molded by, for example, an injection molding, a press molding, the combination of an extrusion molding and roll, or a so-called 2P method (photo polymerization) using an ultraviolet light polymerizable resin.

As the material which composes the light diffusing plate, it is possible to use glasses, a mixture of two or more species of resins which do not tend to be mutually compatible, a transparent resin in which a light diffusing agent is dispersed, and one species of the transparent resin. Among them, the resin is preferable in terms of light weight and good moldability. One species of the transparent resin is preferable in terms of facile luminance enhancement. A transparent resin in which a light diffusing agent is dispersed is preferable in terms of good adjustability of the total light transmittance and the haze.

The transparent resin is a resin having a total light transmittance of 75% or more measured in accordance with JIS K7361-1 using a plate having smooth surfaces on both surfaces and the thickness of 2 mm, and examples thereof may include polyethylene, propylene-ethylene copolymers, polypropylene, polystyrene, copolymers of an aromatic vinyl monomer and alkyl(meth)acrylic acid ester having a lower alkyl group, polyethylene terephthalate, terephthalic acid-ethylene glycol-cyclohexane dimethanol copolymer, polycarbonate, acryl resins and resins having an alicyclic structure. (Meth) acrylic acid means acrylic acid and methacrylic acid.

Among them, resins having a water absorption ratio of 0.25% or less, e.g., polycarbonate, polystyrene, copolymers of the aromatic vinyl based monomer with alkyl (meth) acrylic acid ester having the lower alkyl group containing 10% or more of the aromatic vinyl monomer, and resins having an alicyclic structure are preferable as the transparent resin. Resins having a water absorption ratio of 0.1% or less, e.g., the resin having an alicyclic structure are further preferable. That is because of low tendency of shape changing due to moisture absorption, which enables production of a light diffusing plate having a large size with less warp. The resin having an alicyclic structure is further preferable because of good fluidity which enables efficient production of a large sized light diffusing plate. The mixture of the resin having an alicyclic structure and the light diffusing agent may be suitably used because the mixture has both high transmittance and high diffusibility required for the light diffusing plate, and gives a product with good chromaticity.

The resin having an alicyclic structure is a resin having an alicyclic structure in its main chain and/or side chain. The resin having the alicyclic structure in its main chain is preferable in terms of mechanical strength and heat resistance. Examples of the alicyclic structure may include saturated cyclic hydrocarbon (cycloalkane) structures and unsaturated cyclic hydrocarbon (cycloalkene, cycloalkine) structures. Cycloalkane structures and cycloalkene structures are preferable, and among them, the cycloalkane structure is the most preferable in terms of mechanical strength and heat resistance. Number of carbon atoms which compose the alicyclic structure are typically 4 to 40, preferably 5 to 20 and more preferably 5 to 15 in terms of well balanced mechanical strength, heat resistance and a molding property of the light diffusing plate.

The ratio of the repeating unit having an alicyclic structure in the resin having an alicyclic structure may be appropriately selected depending on a purpose of use, and is typically 50% by weight or more, preferably 70% by weight or more and more preferably 90% by weight or more. Extremely low ratio of the repeating unit having an alicyclic structure is not preferable because heat resistance is reduced thereby. Repeating units other than the repeating unit having an alicyclic structure in the resin having an alicyclic structure is appropriately selected depending on the purpose of use.

Specific examples of the resin having an alicyclic structure may include (1) norbornene polymers such as ring-opening polymers of norbornene monomers, ring-opening copolymers of the norbornene monomer and other monomers ring-opening copolymerizable therewith, hydrogenated products thereof, addition polymers of the norbornene monomer, and addition copolymers of a norbornene based monomer and other monomers ring-opening copolymerizable therewith; (2) monocyclic olefin polymers and hydrogenated products thereof; (3) cyclic conjugated diene polymers and hydrogenated products thereof; and (4) vinyl alicyclic hydrocarbon polymers such as polymers of a vinyl alicyclic hydrocarbon based monomer, copolymers of the vinyl alicyclic hydrocarbon based monomer and other monomers copolymerizable therewith, hydrogenated products thereof, hydrogenated polymers of a vinyl aromatic monomer having hydrogenated aromatic rings, and hydrogenated copolymers of the vinyl aromatic monomer and other monomers copolymerizable therewith having hydrogenated aromatic rings.

In terms of heat resistance and mechanical strength, preferable among them are the norbornene polymers and the vinyl alicyclic hydrocarbon polymers; particularly are hydrogenated products of the ring-opening polymers of the norbornene monomers, hydrogenated products of the ring-opening copolymers of the norbornene monomer and the other monomers ring-opening copolymerizable therewith, hydrogenated polymers of the vinyl aromatic monomer having hydrogenated aromatic rings, and hydrogenated copolymers of the vinyl aromatic monomer and the other monomers copolymerizable therewith having hydrogenated aromatic rings.

The light diffusing agent is particles having a nature to diffuse a light ray and is broadly classified into an inorganic filler and an organic filler. Examples of the inorganic filler may include silica, aluminium hydroxide, aluminium oxide, titanium oxide, zinc oxide, barium sulfate, magnesium silicate and mixtures thereof. Examples of the organic filler may include acryl resins, polyurethane, polyvinyl chloride, polystyrene resins, polyacrylonitrile, polyamide, polysiloxane resins, melamine resins and benzoquanamine resins. Among them, as the organic filler, fine particles composed of the polystyrene resin, the polysiloxane resin and crosslinked products thereof are preferable in terms of high diffusibility, high heat resistance and no coloration (yellowing) upon molding. Among them, the fine particle composed of the crosslinked product of the polysiloxane resin is more preferable in terms of more excellent heat resistance.

Examples of the shape of the light diffusing agent may include spherical, cubic, needle, bar, spindle, platy, scale and fibrous shapes, and among them, the spherical shape is preferable because directions of the light diffused thereby may be isotropic. It is preferable that the light diffusing agent is uniformly dispersed in the transparent resin for use.

The ratio of the light diffusing agent to be dispersed in the transparent resin may be appropriately selected depending on the thickness of the light diffusing plate and the interval between the linear light sources, and typically is adjusted so that the total light transmittance is preferably 60 to 98% and more preferably 65 to 95%. The content of the light diffusing agent is preferably adjusted so that the haze is 20 to 100% and more preferably 25 to 100%. Adjusting the total light transmittance and the haze within the aforementioned suitable range, it is possible to further enhance the luminance and the uniformity ratio of luminance.

The total light transmittance is the value obtained by the measurement using an integrating sphere mode color difference turbidity meter in accordance with JIS K7361-1, as to a plate having flat surfaces on both surfaces and a thickness of 2 mm. The haze is the value obtained by the measurement using an integrating sphere mode color difference turbidity meter in accordance with JIS K7136, as to a plate having flat surfaces on both surfaces and a thickness of 2 mm.

The thickness of the light diffusing plate is preferably 0.4 to 5 mm and more preferably 0.8 to 4 mm. Adjusting the thickness of the light diffusing plate within the aforementioned suitable range, it is possible to reduce a flexure due to the plate's own weight, and to enable easy molding.

The distance (b) between the central position of the linear light source and the light incident plane may be designed in consideration of the thickness of the direct-type backlight device and the uniformity ratio of luminance, and may be for example 10 to 50 mm and is preferably 15 to 30 mm. Adjusting the distance (b) within the aforementioned range, it is possible to reduce the luminance unevenness and to reduce the total thickness of the direct-type backlight device. At that time, it is preferable that the distance (a) and the distance (b) have the relationship of $1<(a)/(b)<3$. Such a constitution may suppress the luminance unevenness without impairing the light utilization efficiency.

As shown in FIG. 2, the light incident plane 1A is a flat plane, and the light outgoing plane 1B is a concavo-convex structure plane having prism row 5 wherein the multiple linear prisms 4 extending in the approximately parallel to the longitudinal direction of the linear light sources 2 are adjacent one another or aligned with the interval. The flat light incident plane 1A is a plane having a center average roughness Ra of 0.001 to 10 μm, and may be a plane whose surface is polished or a rough plane such as a satin finished surface. It is preferable that all of cross sectional shapes of the linear prisms 4 on the light outgoing plane 1B are in approximately identical triangle shape. In this case, it is preferable that an apex angle of the triangle which composes the linear prism 4 is 60 to 170°, and the interval of the triangle prisms adjacent on the same plane is 20 to 700 μm.

Each of the two inclined surfaces 4A which compose the triangle prism may be a polished plane having a mean line average roughness Ra measured in the direction perpendicular to the longitudinal direction of the triangle prism being less than 0.002 μm, or may be formed as a rough plane having a mean line average roughness Ra of 0.002 to 0.5 μm. Possible embodiments for roughening a certain region of the inclined surface may include an embodiment wherein all of the inclined surfaces on all or a part of the linear prisms are roughened, an embodiment wherein a part of the inclined surfaces on all or a part of the linear prisms are roughened, and an embodiment wherein a part of region in each inclined surface on all or a part of the linear prisms are roughened.

In the light diffusing plate in the present embodiment, it is necessary that a relationship of $(a)/7<L<(a)/4$ is satisfied wherein L is a distance (mm) between a central position of one image of two images on said light outgoing plane both corresponding to one linear light source among said plurality of linear light sources, and a position at which a center of said one linear light source is projected on said light outgoing plane. In order to satisfy such a relationship, the prism row on the present light diffusing plate may be composed of linear prisms having an adequate apex angle calculated in accordance with Snell's law depending on the distance (a) between the centers of the linear light sources and the distance (b) between the linear light source and the light incident plane. It is thereby possible to place the position of the image from the linear light source within the aforementioned range. In this case, between the projected position of the linear light source A and the projected position of the linear light source B adjacent to the linear light source A, the apex angles of the linear prisms which constitutes the prism row may continuously change depending on the aforementioned distances (a) and (b), may change stepwise per a number of blocks, or may be fixed to an approximately constant angle.

The light diffusing member having such a configuration may be produced by injection molding with a mold having a cavity surface on which the concavo-convex structure is formed. Such a production may easily give products in a stable manner.

Second Embodiment

Figure 3:
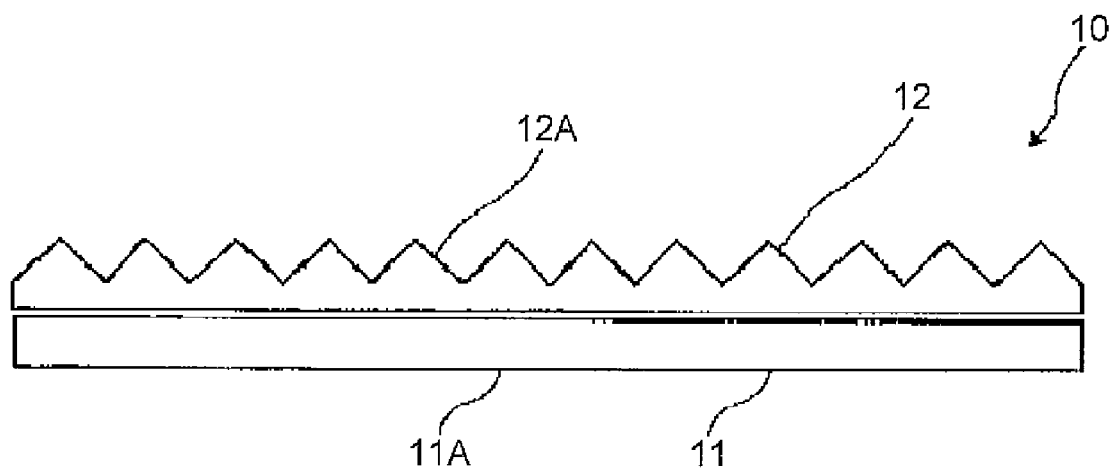
FIG. 3 is a perspective view showing a light diffusing member according to a second embodiment of the present invention.

FIG. 3 is a cross sectional view showing the second embodiment of the light diffusing member used for the direct-type backlight device of the present invention. As shown in FIG. 3, the light diffusing member 10 according to the second embodiment may be in a constitution comprising a light diffusing plate 11 having approximately flat front and back surfaces, and a prism sheet 12 disposed on the surface of the light diffusing plate 11 and having a prism row formed on a plane opposite to a surface facing the light diffusing plate 11. The light incident plane of the light diffusing member is the back surface 11A of the light diffusing plate 11, and the light outgoing plane of the light diffusing member is the plane 12A of the prism sheet 12 on which the prism row has been formed.

The light diffusing plate having approximately flat front and back surfaces may be molded by, for example, injection molding or extrusion molding. As the material used for the light diffusing plate of the present embodiment, the same materials as those used for the light diffusing plate of the first embodiment may be used. The preferable embodiments for the thickness of the light diffusing plate and the distance between the light diffusing plate and the linear light source may be the same as those for the light diffusing plate in the first embodiment.

The prism sheet is a sheet shaped member having on one surface thereof a prism row of linear prisms having a triangle cross section aligned in approximately parallel. The prism row in this prism sheet may be the same ones as the prism row formed on the light diffusing member of the first embodiment.

The prism sheet may be obtained by press-processing of a sheet of a resin (e.g., polycarbonate) having a predetermined reflective index, using a press apparatus comprising a mold having formed thereon a concavo-convex shape of the prism row. The prism sheet may also be produced by coating a substrate made of a resin such as polyester with an ultraviolet light curable resin, and then, while pressing the coating layer with a mold, irradiating the coating layer with ultraviolet light. As the prism sheet, commercially available products such as "BEF" supplied from Sumitomo 3M Ltd. may also be used.

In the light diffusing plate in the present embodiment, it is necessary that a relationship of $(a)/7<L<(a)/4$ is satisfied wherein L is a distance (mm) between a central position of one image of two images on said light outgoing plane both corresponding to one linear light source among said plurality of linear light sources, and a position at which a center of said one linear light source is projected on said light outgoing plane. In order to satisfy such a relationship, for example, the prism row on the prism sheet of the present light diffusing member may be composed of linear prisms having an adequate apex angle calculated in accordance with Snell's law depending on the distance (a) between the centers of the linear light sources and the distance (b) between the linear light source and the light incident plane. It is thereby possible to place the position of the image from the linear light source within the aforementioned range. In this case, between the projected position of the linear light source A and the projected position of the linear light source B adjacent to the linear light source A, the apex angles of the linear prisms which constitutes the prism sheet may continuously change depending on the aforementioned distances (a) and (b), may change stepwise per a number of blocks, or may be fixed to an approximately constant angle. In the present embodiment, the same effect as in the first embodiment may be obtained.

<Variation Examples>

The aforementioned direct type backlight devices may appropriately include other optical members disposed for the purpose of further enhancing the luminance and the uniformity ratio of luminance. Examples of such an optical member may include light diffusing sheets (translucent sheets or films for diffusing the light), the aforementioned prism sheet, and reflective polarizers. Among them, it is preferable to dispose the reflective polarizer because the luminance may be particularly enhanced thereby. One species of these optical members may be used alone, or two or more species thereof may be used in combination. In this case, one alone of or two or more of each optical member may be used. The position for disposing these optical members is not particularly limited, but it is preferable to dispose them on the side of the light outgoing surface of the light diffusing member.

Examples of the reflective polarizer may include a reflective polarizer utilizing the difference of reflectances of polarized components by Brewster's angle (e.g., those described in JP Hei-6-508449-A); a reflective polarizer utilizing a selective reflection property of a cholesteric liquid crystal, specifically a laminate body of ¼ wavelength plate and a film composed of the cholesteric liquid crystal (e.g., those described in JP Hei-3-45906-A); a reflective polarizer to which a fine metal linear pattern has been given (e.g., those described in JP Hei-2-308106-A); a reflective polarizer which is a laminate of at least two polymer films for utilizing anisotropy of the reflectance by refractive index anisotropy (e.g., those described in JP Hei-9-506837 A); a reflective polarizer having a sea-island structure formed by at least two polymers in a polymer film and utilizing anisotropy of the reflectance by refractive index anisotropy (e.g., those described in U.S. Pat. No. 5,825,543); a reflective polarizer of a polymer film containing particles dispersed therein for utilizing anisotropy of the reflectance by refractive index anisotropy (e.g., those described in JP Hei-11-509014-A); and a reflective polarizer of a polymer film containing inorganic particles dispersed therein for utilizing anisotropy of the reflectance based on the difference of scattering abilities due to the sizes (e.g., those described in JP Hei-9-297204-A). As such a reflective polarizer, for example, commercially available products such as "DBEF-D" and "DBEF-DTV" supplied from Sumitomo 3M Ltd. may be used.

EXAMPLES

The present invention will be described in more detail with reference to the following Examples and Comparative Examples, but the present invention is not limited to these Examples. Parts and % are based on the weight unless otherwise specified.

<Production of Pellets for Light Diffusing Member>

(Pellet A1 for Light Diffusing Member)

99.7 parts of a resin having an alicyclic structure (Zeonor 1060R supplied from Zeon Corporation, water absorption rate: 0.01%) as a transparent resin, and 0.3 parts of fine particles composed of a crosslinked product of a polysiloxane polymer having an average particle diameter of 2 μm as a light diffusing agent were mixed. The mixture was kneaded and extruded into a strand shape by a biaxial extruder, and the extruded product was cut by a pelletizer, to produce a pellet A1 for the light diffusing member, Using this pellet A1 for the light diffusing member as a raw material, a test plate having smooth surfaces on both sides, a thickness of 2 mm and a size of 100 mm×50 mm was formed using an injection molding machine (mold clamping force: 1000 kN). The total light transmittance and the haze of this test plate were measured based on JIS K7361-1 and JIS K7136, respectively, using an integrating sphere mode color difference turbidity meter. The test plate had the total light transmittance of 86% and the haze of 99%.

(Pellet A2 for Light Diffusing Member)

99.8 parts of the resin having the alicyclic structure which is the same as the aforementioned resin as a transparent resin, and 0.2 parts of the light diffusing agent which is the same as the aforementioned agent were mixed, and a pellet A2 for the light diffusing member was produced in the same manner as the aforementioned procedure. Using this pellet A2 for the light diffusing member as a raw material, a test plate having surfaces on both sides, a thickness of 2 mm and a size of 100 mm×50 mm was formed using the injection molding machine (mold clamping force: 1000 kN). The test plate had the total light transmittance of 91% and the haze of 97%.

<Production of Mold Components>

(Mold Component B1)

A nickel-phosphorus non-electrolytic plating having a thickness of 100 μm was given to the entire surface of a stainless steel SUS430 having a dimension of 387 mm×308 mm×thickness of 100 mm. On the nickel-phosphorus none electrolytical plating surface, cutting process was given using a diamond cutting tool having a tip having an isosceles triangle shape with the apex angle of 100 degrees, to form a plurality of grooves having a triangle cross section along a side of a length 387 mm (long side direction) with a pitch of 70 μm. In this manner, a mold component B1 on which a plurality of grooves having a cross sectional shape of isosceles triangles with the apex angle of 100 degrees were aligned in approximately parallel was produced.

(Mold Component B2)

A mold component B2 on which a plurality of grooves having a cross sectional shape of isosceles triangles with the apex angle of 85 degrees were aligned in approximately parallel was produced in the same manner as in the case of the mold component B1, except using a diamond cutting tool having a tip having an isosceles triangle shape with the apex angle of 85 degrees as the cutting tool.

(Mold Component B3)

A mold component B3 on which a plurality of grooves having a cross sectional shape of isosceles triangles with the apex angle of 130 degrees were aligned in approximately parallel was produced in the same manner as in the case of the mold component B1, except using a diamond cutting tool having a tip having an isosceles triangle shape with the apex angle of 130 degrees as the cutting tool.

(Mold Component B4)

A mold component B4 on which a plurality of grooves having a cross sectional shape of isosceles triangles with the apex angle of 80 degrees were aligned in approximately parallel was produced in the same manner as in the case of the mold component B1, except using a diamond cutting tool having a tip having an isosceles triangle shape with the apex angle of 80 degrees as the cutting tool.

(Mold Component B5)

A mold component B5 on which a plurality of grooves having a cross sectional shape of isosceles triangles with the apex angle of 90 degrees were aligned in approximately parallel was produced in the same manner as in the case of the mold component B1, except using a diamond cutting tool having a tip having an isosceles triangle shape with the apex angle of 90 degrees as the cutting tool.

(Mold Component B6)

A mold component B6 on which a plurality of grooves having a cross sectional shape of isosceles triangles with the apex angle of 125 degrees were aligned in approximately parallel was produced in the same manner as in the case of the mold component B1, except using a diamond cutting tool having a tip having an isosceles triangle shape with the apex angle of 125 degrees as the cutting tool.

(Mold Component B7)

A mold component B7 on which a plurality of grooves having a cross sectional shape of isosceles triangles with the apex angle of 110 degrees were aligned in approximately parallel was produced in the same manner as in the case of the mold component B1, except using a diamond cutting tool having a tip having an isosceles triangle shape with the apex angle of 110 degrees as the cutting tool.

(Mold Component B8)

A mold component B8 on which a plurality of grooves having a cross sectional shape of isosceles triangle with the apex angle of 140 degrees were aligned in approximately parallel was produced in the same manner as in the case of the mold component B1, except using a diamond cutting tool having a tip having an isosceles triangle shape with the apex angle of 140 degrees as the cutting tool.

(Mold Component B9)

A mold component B9 on which a plurality of grooves having a cross sectional shape of isosceles triangle with the apex angle of 75 degrees were aligned in approximately parallel was produced in the same manner as in the case of the mold component B1, except using a diamond cutting tool having a tip having an isosceles triangle shape with the apex angle of 75 degrees as the cutting tool.

<Production of Light Diffusing Members>

(Light Diffusing Member 1)

Using an injection molding machine (mold clamping force: 4,410 kN) with the mold component B1, and the pellet A1 for the light diffusing member as a raw material, a light diffusing member 1 was molded under the conditions of a cylinder temperature at 280° C. and a mold temperature at 85° C. The resulting light diffusing member 1 was of a rectangular shape having a thickness of 2 mm and the size of 315 mm×237 μmm and had on one surface thereof a prism row of a plurality of linear prisms aligned in approximately parallel having a cross section of convex isosceles triangles. The linear prism had an apex angle of 100° and pitch of 70 μm. On each inclined surface which composes the linear prism, the mean line average roughness Ra along the crosswise direction of the linear prism was 0.005 μm. The other surface of the light diffusing member was a flat surface having its mean line average roughness Ra of 0.12 μm.

(Light Diffusing Member 2)

A light diffusing member 2 was molded in the same manner as in the production of the light diffusing member 1, except that the mold component B2 was used in place of the mold component B1. The resulting light diffusing member 2 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 85° and pitch of 70 μm. On each inclined surface which composes the linear prism, the mean line average roughness Ra along the crosswise direction of the linear prism was 0.007 μm. The other surface of the light diffusing member was a flat surface having its mean line average roughness Ra of 0.12 W.

(Light Diffusing Member 3)

A light diffusing member 3 was molded in the same manner as in the production of the light diffusing member 1 except that the mold component B3 was used in place of the mold component B1. The resulting light diffusing member 3 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 130° and pitch of 70 μm. On each inclined surface which composes the linear prism, the mean line average roughness Ra along the crosswise direction of the linear prism was 0.004 μm. The other surface of the light diffusing member was a flat surface having its mean line average roughness Ra of 0.12 μm.

(Light Diffusing Member 4)

A light diffusing member 4 was molded in the same manner as in the production of the light diffusing member 1 except that the mold component B4 was used in place of the mold component B1. The resulting light diffusing member 4 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 80° and pitch of 70 μm. On each inclined surface which composes the linear prism, the mean line average roughness Ra along the crosswise direction of the linear prism was 0.010 μm. The other surface of the light diffusing member was a flat surface having its mean line average roughness Ra of 0.12 μm.

(Light Diffusing Member 5)

A light diffusing member 5 was molded in the same manner as in the production of the light diffusing member 1 except that the mold component B5 was used in place of the mold component B1. The resulting light diffusing member 5 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 90° and pitch of 70 μm. On each inclined surface which composes the linear prism, the mean line average roughness Ra along the crosswise direction of the linear prism was 0.008 μm. The other surface of the light diffusing member was a flat surface having its mean line average roughness Ra of 0.12 μm.

(Light Diffusing Member 6)

A light diffusing member 6 was molded in the same manner as in the production of the light diffusing member 1 except that the mold component B6 was used in place of the mold component B1. The resulting light diffusing member 6 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 125° and pitch of 70 μm. On each inclined surface which composes the linear prism, the mean line average roughness Ra along the crosswise direction of the linear prism was 0.004 μm. The other surface of the light diffusing member was a flat surface having its mean line average roughness Ra of 0.12 μm.

(Light Diffusing Member 7)

A light diffusing member 7 was molded in the same manner as in the production of the light diffusing member 1 except that the mold component B7 was used in place of the mold component B1. The resulting light diffusing member 7 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 110° and pitch of 70 μm. On each inclined surface which composes the linear prism, the mean line average roughness Ra along the crosswise direction of the linear prism was 0.005 μm. The other surface of the light diffusing member was a flat surface having its mean line average roughness Ra of 0.12 μm.

(Light Diffusing Member 8)

A light diffusing member 8 was molded in the same manner as in the production of the light diffusing member 1 except that the mold component B8 was used in place of the mold component B1. The resulting light diffusing member 8 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 140° and pitch of 70 μm. On each inclined surface which composes the linear prism, the mean line average roughness Ra along the crosswise direction of the linear prism was 0.005 μm. The other surface of the light diffusing member was a flat surface having its mean line average roughness Ra of 0.12 μm.

(Light Diffusing Member 9)

A light diffusing member 9 was molded in the same manner as in the production of the light diffusing member 1 except that the mold component B9 was used in place of the mold component B1. The resulting light diffusing member 9 was of a rectangular shape having a thickness of 2 mm and the size of 315 mm×237 mm, and had on one surface thereof a prism row of a plurality of linear prisms aligned in approximately parallel having a cross section of convex isosceles triangles. The linear prism had an apex angle of 75° and pitch of 70 μm. On each inclined surface which composes the linear prism, the mean line average roughness Ra along the crosswise direction of the linear prism was 0.009 μm. The other surface of the light diffusing member was a flat surface having its mean line average roughness Ra of 0.12 μm.

(Light Diffusing Plate X)

The pellet A2 for the light diffusing member as the raw material was extruded from a T die having a width of 300 mm using a uniaxial extruder (SE-90E EV, L/D26 supplied from Toshiba Machine Co., Ltd.) having a screw diameter of 90 mm. In the uniaxial extruder, the cylinder temperature was set at 220° C. and the die head temperature was set at 210° C. An extruded plate having a thickness of 2.0 mm was produced thereby, and cut into a size of 150 mm×80 mm to obtain a light diffusing plate X having approximately flat surfaces on both sides. One surface of this light diffusing plate X had a mean line average roughness Ra of 0.020 μm, and the other surface had a mean line average roughness Ra of 0.023 μm.

<Prism Sheets>

(Prism Sheet P1)

A commercially available prism sheet P1 ("BEF III" supplied from Sumitomo 3M Ltd.) was used. This prism sheet P1 had an apex angle of 90°, pitch of 50 μm and a thickness of 0.3 mm.

(Prism Sheet P2)

On a metal plate, V-shaped cuts having an apex angle of 100° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P2 having a thickness of 0.3 mm.

(Prism Sheet P3)

On a metal plate, V-shaped cuts having an apex angle of 90° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P3 having a thickness of 0.3 mm.

(Prism Sheet P4)

On a metal plate, V-shaped cuts having an apex angle of 140° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P4 having a thickness of 0.3 mm.

(Prism Sheet P5)

On a metal plate, V-shaped cuts having an apex angle of 70° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P5 having a thickness of 0.3 mm.

(Prism Sheet P6)

On a metal plate, V-shaped cuts having an apex angle of 130° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P6 having a thickness of 0.3 mm.

(Prism Sheet P7)

On a metal plate, V-shaped cuts having an apex angle of 95° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P7 having a thickness of 0.3 mm.

(Prism Sheet P8)

On a metal plate, V-shaped cuts having an apex angle of 80° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P8 having a thickness of 0.3 mm.

(Prism Sheet P9)

On a metal plate, V shaped cuts having an apex angle of 135° were formed with pitch of 70 μm, to form a stamper. Using a press apparatus provided with the stamper, a sheet (Panlite Sheet PC-1151, thickness: 0.4 mm supplied from Teijin Chemicals Ltd.) was pressed at 250° C., to obtain a prism sheet P9 having a thickness of 0.3 mm.

Example 1

A reflection sheet (E6SV supplied from Toray Industries, Inc.) was attached as a reflecting plate on an internal surface of a case made of plastic having a milk-white color and an internal width of 300 mm, length of 200 mm and depth of 20 mm. The surface of this reflecting plate was a flat plane having a mean line average roughness Ra of 0.97 μm, Six cold cathode tubes having a diameter of 3.0 mm and a length of 360 mm were disposed at a level so that the interval between the tubes and the bottom of the reflecting plate was 5 mm. The distance (a) between centers of the cold cathode tubes was 34 mm. The tubes were secured at vicinity of the electrode section with a silicone sealant and an inverter was installed.

Subsequently, on the plastic case in which the cold cathode tubes had been installed, the light diffusing member 1 was disposed so that the flat plane surface thereof faced the cold cathode tubes. At that time, the position of the light diffusing member 1 was adjusted so that a distance (b) between the central position of the linear light source and the aforementioned flat plane (light incident plane) of the light diffusing member was 15.0 mm. Then, a light diffusing sheet D1 ("188GM3" supplied from Kimoto Co., Ltd.), the prism sheet P1 and a reflective polarizer R1 ("DBEF-D" supplied from Sumitomo 3M Ltd.) were disposed in this order on a light outgoing plane of the light diffusing member 1. Further, a polarizing plate was installed on the reflective polarizer to produce a direct-type backlight device.

A tube current of 5.5 mA was applied to the resulting direct-type backlight device for lighting up the cold cathode tubes, and the luminance in a front direction was measured at 100 points with equal intervals on the centerline in a crosswise direction using a two dimensional color distribution measurement apparatus. The positions of the split images were specified from the result of this luminance measurement. The distance L between the central position of one image corresponding to one linear light source and the position at which the center of the one linear light source was projected on the light outgoing plane of the light diffusing member A was 7.1 mm. This value satisfied the relationship of (a)/7<L<(a)/4 as the distance (a) between the centers of the linear light sources was 34 mm, (a)/7 was 4.9 mm and (a)/4 was 8.5 mm. From the aforementioned result of luminance measurement, the average luminance (front luminance) La and the luminance unevenness Lu in the front direction were calculated in accordance with the following mathematical formulae (1) and (2). As a result, the front luminance was 4,989 cd/m² and the luminance unevenness was 0.6%.

$$\text{Average luminance } La=(L1+L2)/2 \quad \text{(formula (1))}$$

$$\text{Luminance unevenness } Lu=[(L1-L2)/La]\times 100 \quad \text{(formula (2))}$$

L1: Average of luminance local maximal values directly above the plural cold cathode tubes L2: Average of local minimal values between the local maximal values The luminance unevenness is an indicator which indicates an evenness of the luminance. The greater the luminance unevenness is, remarkable, the larger the numerical value.

Comparative Example 1

A direct-type backlight device was obtained in the same manner as in Example 1 except that the light diffusing member 1 was changed to the light diffusing member 2. This direct type backlight device was evaluated in the same manner as in Example 1, and the distance L between the central position of one image corresponding to one linear light source and the position at which the center of the one linear light source was projected on the light outgoing plane of the light diffusing member was 9.1 mm. This value did not satisfy the relationship of (a)/7<L<(a)/4 as the distance (a) between the centers of the linear light sources was 34 mm, (a)/7 was 4.9 mm and (a)/4 was 8.5 mm. The front luminance was 4,935 cd/m² and the luminance unevenness was 1.7%.

Comparative Example 2

A direct-type backlight device was obtained in the same manner as in Example 1 except that the light diffusing member 1 was changed to the light diffusing member 3. This direct-type backlight device was evaluated in the same manner as in Example 1, and the distance L between the central position of one image corresponding to one linear light source and the position at which the center of the one linear light source was projected on the light outgoing plane of the light diffusing member was 4.0 mm. This value did not satisfy the relationship of (a)/7<L<(a)/4 as the distance (a) between the centers of the linear light sources was 34 mm, (a)/7 was 4.9 mm and (a)/4 was 8.5 mm. The front luminance was 5,050 cd/m² and the luminance unevenness was 2.6%.

Results in Example 1 and Comparative Examples 1 and 2 are shown in Table 1.

TABLE 1

|  | unit | Ex. 1 | Comp. Ex. 1 | Comp. Ex. 2 |
|---|---|---|---|---|
| Optical sheet | — | Reflective polarizer R1 Prism sheet P1 Light diffusing sheet D1 | Reflective polarizer R1 Prism sheet P1 Light diffusing sheet D1 | Reflective polarizer R1 Prism sheet P1 Light diffusing sheet D1 |

TABLE 1-continued

|  | unit | Ex. 1 | Comp. Ex. 1 | Comp. Ex. 2 |
|---|---|---|---|---|
| Light diffusing member | — | Light diffusing member 1 | Light diffusing member 2 | Light diffusing member 3 |
| Distance (a) between centers of linear light sources | mm | 34 | 34 | 34 |
| Distance (b) between the central position of the linear light source and the light incident plane | mm | 15 | 15 | 15 |
| (a)/(b) | — | 2.3 | 2.3 | 2.3 |
| Distance L between the central position of the linear light source and the central position of the image of the linear light source | mm | 7.1 | 9.1 | 4.0 |
| (a) × (¼) | — | 8.5 | 8.5 | 8.5 |
| (a) × (⅐) | — | 4.9 | 4.9 | 4.9 |
| Average luminance | cd/m² | 4989 | 4935 | 5050 |
| Front luminance uniformity ratio | % | 0.6 | 1.7 | 2.6 |

As shown in Table 1, it was found out that Example 1 had a sufficient luminance and capability to reduce luminance unevenness. On the contrary, it was found out that, although sufficient luminance was observed, Comparative Examples 1 and 2 were poor in occurrence of luminance unevenness.

Example 2

A direct-type backlight device was obtained in the same manner as in Example 1 except that the reflective polarizer R1 was changed to a reflective polarizer R2 ("DBEF-DTV" supplied from Sumitomo 3M Ltd.). The reflective polarizer R2 is an optical sheet on which a prism row composed of a plurality of linear prisms is formed on the surface of a reflective polarizer. As to this direct-type backlight device, luminance was measured in the same manner as the above, and split images appeared at the same positions as in Example 1. Thus, the present Example satisfied the relationship of (a)/7<L<(a)/4. The front luminance was 5,827 cd/m² and the luminance unevenness was 0.9%.

Comparative Example 3

A direct-type backlight device was obtained in the same manner as in Example 2 except that the light diffusing member 1 was changed to the light diffusing member 2. As to this direct-type backlight device, the luminance was measured in the same manner as the above, and split images appeared in the same position as in Example 1. Thus, the present Example did not satisfy the relationship of (a)/7<L<(a)/4. The front luminance was 5,803 cd/m² and the luminance unevenness was 2.1%.

Comparative Example 4

A direct-type backlight device was obtained in the same manner as in Example 2 except that the light diffusing member 1 was changed to the light diffusing member 3. As to this direct-type backlight device, the luminance was measured in the same manner as the above, and split images appeared in the same position as in Example 1. Thus, the present Example did not satisfy the relationship of (a)/7<L<(a)/4. The front luminance was 5,835 cd/m² and the luminance unevenness was 2.7%.

The results in Example 2 and Comparative Examples 3 and 4 are shown in Table 2.

TABLE 2

|  | unit | Ex. 2 | Comp. Ex. 3 | Comp. Ex. 4 |
|---|---|---|---|---|
| Optical sheet | — | Reflective polarizer R2 Prism sheet P1 Light diffusing sheet D1 | Reflective polarizer R2 Prism sheet P1 Light diffusing sheet D1 | Reflective polarizer R2 Prism sheet P1 Light diffusing sheet D1 |
| Light diffusing member | — | Light diffusing member 1 | Light diffusing member 2 | Light diffusing member 3 |
| Distance (a) between centers of linear light sources | mm | 34 | 34 | 34 |
| Distance (b) between the central position of the linear light source and the light incident plane | mm | 15 | 15 | 15 |
| (a)/(b) | — | 2.3 | 2.3 | 2.3 |
| The distance L between the central position of the linear light source and the central position of the image of the linear light source | mm | 7.1 | 9.1 | 4.0 |
| (a) × (¼) | — | 8.5 | 8.5 | 8.5 |
| (a) × (⅐) | — | 4.9 | 4.9 | 4.9 |
| Average luminance | cd/m² | 5827 | 5803 | 5835 |
| Front luminance uniformity ratio | % | 0.9 | 2.1 | 2.7 |

As shown in Table 2, it was found out that Example 2 had a sufficient luminance and capability to reduce luminance unevenness. On the contrary, it was found out that, although sufficient luminance was observed, Comparative Examples 3 and 4 were poor in occurrence of luminance unevenness.

Example 3

A direct-type backlight device was obtained in the same manner as in Example 1 except that the reflective polarizer R1 was changed to the light diffusing sheet D1. As to this direct-type backlight device, luminance was measured in the same manner as the above, and split images appeared at the same positions as in Example 1. Thus, the present Example satisfied the relationship of (a)/7<L<(a)/4. The front luminance was 6,484 cd/m² and the luminance unevenness was 0.9%.

Comparative Example 5

A direct-type backlight device was obtained in the same manner as in Example 3 except that the light diffusing member 1 was changed to the light diffusing member 4. This direct-type backlight device was evaluated in the same manner as in Example 1, and the distance L between the central position of one image corresponding to one linear light source and the position at which the center of the one linear light source was projected on the light outgoing plane of the light diffusing member was 9.9 mm. This value did not satisfy the relationship of (a)/7<L<(a)/4 as the distance (a) between the centers of the linear light sources was 34 mm, (a)/7 was 4.9 mm and (a)/4 was 8.5 mm. The front luminance was 6,392 cd/m² and the luminance unevenness was 2.5%.

Comparative Example 6

A direct-type backlight device was obtained in the same manner as in Example 3 except that the light diffusing member 1 was changed to the light diffusing member 3. This direct-type backlight device was evaluated in the same manner as in Example 1, and the distance L between the central position of one image corresponding to one linear light source and the position at which the center of the one linear light source was projected on the light outgoing plane of the light diffusing member was 4.0 mm. This value did not satisfy the relationship of (a)/7<L<(a)/4 as the distance (a) between the centers of the linear light sources was 34 mm, (a)/7 was 4.9 mm and (a)/4 was 8.5 mm. The front luminance was 6,477 cd/m² and the luminance unevenness was 2.9%.

The results in Example 3 and Comparative Examples 5 and 6 are shown in Table 3.

TABLE 3

|  | unit | Ex. 3 | Comp. Ex. 5 | Comp. Ex. 6 |
|---|---|---|---|---|
| Optical sheet | — | Light diffusing sheet D1 Prism sheet P1 Light diffusing sheet D1 | Light diffusing sheet D1 Prism sheet P1 Light diffusing sheet D1 | Light diffusing sheet D1 Prism sheet P1 Light diffusing sheet D1 |
| Light diffusing member | — | Light diffusing member 1 | Light diffusing member 4 | Light diffusing member 3 |
| Distance (a) between centers of linear light sources | mm | 34 | 34 | 34 |
| Distance (b) between the central position of the linear light source and the light incident plane | mm | 15 | 15 | 15 |
| (a)/(b) | — | 2.3 | 2.3 | 2.3 |
| Distance L between the central position of the linear light source and the central position of the image of the linear light source | mm | 7.1 | 9.9 | 4.0 |
| (a) × (¼) |  | — | 8.5 | 8.5 | 8.5 |
| (a) × (⅐) |  | — | 4.9 | 4.9 | 4.9 |
| Average luminance | cd/m² | 6484 | 6392 | 6477 |
| Front luminance uniformity ratio | % | 0.9 | 2.5 | 2.9 |

As shown in Table 3, it was found out that Example 3 had a sufficient luminance and capability to reduce luminance unevenness. On the contrary, it was found out that, although sufficient luminance was observed, Comparative Examples 5 and 6 were poor in occurrence of luminance unevenness.

Example 4

The plastic case with the reflecting plate used in Example 1 was used. In the case, five cold cathode tubes having a diameter of 3.0 mm and a length of 360 mm were disposed so that the interval between the tubes and the bottom of this reflecting plate was 5 mm. The distance (a) between the centers of the cold cathode tubes was 40 mm. The tubes were secured at vicinity of the electrode section with a silicone sealant and an inverter was installed.

Subsequently, on the plastic case in which the cold cathode tubes had been installed, the light diffusing member 5 was disposed so that the flat plane surface thereof faced the cold cathode tubes. At that time, the position of the light diffusing member 5 was adjusted so that a distance (b) between the central position of the linear light source and the aforementioned flat plane (light incident plane) of the light diffusing member was 15.0 mm. Then, the light diffusing sheet D1, the prism sheet P1 and the reflective polarizer R1 were disposed in this order on a light outgoing plane of the light diffusing member 5. Further, a polarizing plate was installed on the reflective polarizer R1 to produce a direct-type backlight device.

The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 2 was 8.4 mm. This value satisfied the relationship of (a)/7<L<(a)/4 as the distance (a) between the centers of the linear light sources was 40 mm, (a)/7 was 5.7 mm and (a)/4 was 10.0 mm. The front luminance was 4,240 cd/m² and the luminance unevenness was 0.9%.

Comparative Example 7

A direct-type backlight device was produced in the same manner as in Example 4 except that the light diffusing member 5 was changed to the light diffusing member 4. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 10.8 mm. This value did not satisfy the relationship of (a)/7<L<(a)/4 as the distance (a) between the centers of the linear light sources was 40 mm, (a)/7 was 5.7 mm and (a)/4 was 10.0 mm. The front luminance was 4,163 cd/m² and the luminance unevenness was 1.9%.

Comparative Example 8

A direct-type backlight device was obtained in the same manner as in Example 4 except that the light diffusing member 5 was changed to the light diffusing member 6. This direct-type backlight device was evaluated in the same manner as in Example 1, and the distance L between the central position of one image corresponding to one linear light source and the position at which the center of the one linear light source was projected on the light outgoing plane of the light diffusing member was 4.9 mm. This value did not satisfy the relationship of (a)/7<L<(a)/4 as the distance (a) between the centers of the linear light sources was 40 mm, (a)/7 was 5.7 mm and (a)/4 was 10.0 mm. The front luminance was 4,258 cd/m² and the luminance unevenness was 2.2%.

The results in Examples 4 and Comparative Examples 7 and 8 are shown in Table 4.

TABLE 4

|  | unit | Ex. 4 | Comp. Ex. 7 | Comp. Ex. 8 |
|---|---|---|---|---|
| Optical sheet | — | Reflective polarizer R1 Prism sheet P1 Light diffusing sheet D1 | Reflective polarizer R1 Prism sheet P1 Light diffusing sheet D1 | Reflective polarizer R1 Prism sheet P1 Light diffusing sheet D1 |
| Light diffusing member | — | Light diffusing member 5 | Light diffusing member 4 | Light diffusing member 6 |
| Distance (a) between centers of linear light sources | mm | 40 | 40 | 40 |

TABLE 4-continued

|  | unit | Ex. 4 | Comp. Ex. 7 | Comp. Ex. 8 |
|---|---|---|---|---|
| Distance (b) between the central position of the linear light source and the light incident plane | mm | 15 | 15 | 15 |
| (a)/(b) | — | 2.7 | 2.7 | 2.7 |
| Distance L between the central position of the linear light source and the central position of the image of the linear light source | mm | 8.4 | 10.8 | 4.9 |
| (a) × (¼) | — | 10.0 | 10.0 | 10.0 |
| (a) × (⅐) | — | 5.7 | 5.7 | 5.7 |
| Average luminance | cd/m² | 4240 | 4163 | 4258 |
| Front luminance uniformity ratio | % | 0.9 | 1.9 | 2.2 |

As shown in Table 4, it was found out that Example 4 had a sufficient luminance and capability to reduce luminance unevenness. On the contrary, it was found out that, although sufficient luminance was observed Comparative Examples 7 and 8 were poor in occurrence of luminance unevenness.

Example 5

The plastic case with the reflecting plate used in Example 1 was used. In the case, five cold cathode tubes having a diameter of 3.0 mm and the length of 360 mm were disposed so that the interval between the tubes and the bottom of this reflecting plate was 5 mm. The distance (a) between the centers of the cold cathode tubes was 40 mm. The tubes were secured at vicinity of the electrode section with a silicone sealant and an inverter was installed.

Subsequently, on the plastic case in which the cold cathode tubes had been installed, the light diffusing member 7 was disposed so that the flat plane surface thereof faced the cold cathode tubes. At that timer the position of the light diffusing member 7 was adjusted so that a distance (b) between the central position of the linear light source and the aforementioned flat plane (light incident plane) of the light diffusing member was 25.0 mm. Then, the light diffusing sheet D1, the prism sheet P1 and the reflective polarizer R1 were disposed in this order on the light outgoing plane of the light diffusing member 3. Further, a polarizing plate was installed on the reflective polarizer R1 to produce a direct-type backlight device.

The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 3 was 9.6 mm. This value satisfied the relationship of (a)/7<L<(a)/4 as the distance (a) between the centers of the linear light sources was 40 mm, (a)/7 was 5.7 mm and (a)/4 was 10.0 mm. The front luminance was 4,193 cd/m² and the luminance unevenness was 0.4%.

Comparative Example 9

A direct-type backlight device was produced in the same manner as in Example 5 except that the light diffusing member 7 was changed to the light diffusing member 5. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 2 was 13.6 mm. This value did not satisfy the relationship of (a)/7<L<(a)/4 as the distance (a) between the centers of the linear light sources was 40 mm, (a)/7 was 5.7 mm and (a)/4 was 10.0 mm. The front luminance was 4,127 cd/m² and the luminance unevenness was 1.7%.

Comparative Example 10

A direct type backlight device was obtained in the same manner as in Example 5 except that the light diffusing member 7 was changed to the light diffusing member 8. This direct-type backlight device was evaluated in the same manner as in Example 1, and the distance L between the central position of one image corresponding to one linear light source and the position at which the center of the one linear light source was projected on the light outgoing plane of the light diffusing member was 5.1 mm. This value did not satisfy the relationship of (a)/7<L<(a)/4 as the distance (a) between the centers of the linear light sources was 40 mm, (a)/7 was 5.7 mm and (a)/4 was 10.0 mm. The front luminance was 4,136 cd/m² and the luminance unevenness was 1.8%.

The results in Examples 5 and Comparative Examples 9 and 10 are shown in Table 5.

TABLE 5

|  | unit | Ex. 5 | Comp. Ex. 9 | Comp. Ex. 10 |
|---|---|---|---|---|
| Optical sheet | — | Reflective polarizer R1 Prism sheet P1 Light diffusing sheet D1 | Reflective polarizer R1 Prism sheet P1 Light diffusing sheet D1 | Reflective polarizer R1 Prism sheet P1 Light diffusing sheet D1 |
| Light diffusing member | — | Light diffusing member 7 | Light diffusing member 5 | Light diffusing member 8 |
| Distance (a) between centers of linear light sources | mm | 40 | 40 | 40 |
| Distance (b) between the central position of the linear light source and the light incident plane | mm | 25 | 25 | 25 |
| (a)/(b) | — | 1.6 | 1.6 | 1.6 |
| Distance L between the central position of the linear light source and the central position of the image of the linear light source | mm | 9.6 | 13.6 | 5.1 |
| (a) × (¼) | — | 10.0 | 10.0 | 10.0 |
| (a) × (⅐) | — | 5.7 | 5.7 | 5.7 |
| Average luminance | cd/m² | 4193 | 4127 | 4136 |
| Front luminance uniformity ratio | % | 0.4 | 1.7 | 1.8 |

As shown in Table 5, it was found out that Example 5 had a sufficient luminance and capability to reduce luminance unevenness. On the contrary, it was found out that, although sufficient luminance was observed, Comparative Examples 9 and 10 were poor in occurrence of luminance unevenness.

Example 6

The plastic case with the reflecting plate used in Example 1 was used in the case, four cold cathode tubes having a diameter of 3.0 mm and the length of 360 mm were disposed so that the interval between the tubes and the bottom of this reflecting plate was 5 mm. The distance (a) between the centers of the cold cathode tubes was 50 mm. The tubes were secured at vicinity of the electrode section with a silicone sealant and an inverter was installed.

Subsequently, on the plastic case in which the cold cathode tubes had been installed, the light diffusing member 5 was disposed so that the flat plane surface thereof faced the cold cathode tubes. At that time, the position of the light diffusing member 5 was adjusted so that a distance (b) between the central position of the linear light source and the aforementioned flat plane (light incident plane) of the light diffusing member was 20.0 mm. Then, the light diffusing sheet D1, the prism sheet P1 and the reflective polarizer R1 were disposed in this order on the light outgoing plane of the light diffusing member 2. Further, a polarizing plate was installed on the reflective polarizer R1 to produce a direct type backlight device.

The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 2 was 11.0 mm. This value satisfied the relationship of (a)/7<L<(a)/4 as the distance (a) between the centers of the linear light sources was 50 mm, (a)/7 was 7.1 mm and (a)/4 was 12.5 mm. The front luminance was 3,314 cd/m² and the luminance unevenness was 0.7%.

Comparative Example 11

A direct-type backlight device was obtained in the same manner as in Example 6 except that the light diffusing member 5 was changed to the light diffusing member 9. This direct-type backlight device was evaluated in the same manner as in Example 1, and the distance L between the central position of one image corresponding to one linear light source and the position at which the center of the one linear light source was projected on the light outgoing plane of the light diffusing member was 14.1 mm. This value did not satisfy the relationship of (a)/7<L<(a)/4 as the distance (a) between the centers of the linear light sources was 50 mm, (a)/7 was 7.1 mm and (a)/4 was 12.5 mm. The front luminance was 3,073 cd/m² and the luminance unevenness was 2.4%.

Comparative Example 12

A direct type backlight device was obtained in the same manner as in Example 6 except that the light diffusing member 5 was changed to the light diffusing member 6. This direct-type backlight device was evaluated in the same manner as in Example 1, and the distance L between the central position of one image corresponding to one linear light source and the position at which the center of the one linear light source was projected on the light outgoing plane of the light diffusing member was 5.8 mm. This value did not satisfy the relationship of (a)/7<L<(a)/4 as the distance (a) between the centers of the linear light sources was 50 mm, (a)/7 was 7.1 mm and (a)/4 was 12.5 mm. The front luminance was 3,328 cd/m² and the luminance unevenness was 1.8%.

The results in Examples 6 and Comparative Examples 11 and 12 are shown in Table 6.

TABLE 6

| | unit | Ex. 6 | Comp. Ex. 11 | Comp. Ex. 12 |
|---|---|---|---|---|
| Optical sheet | — | Reflective polarizer R1 Prism sheet P1 Light diffusing sheet D1 | Reflective polarizer R1 Prism sheet P1 Light diffusing sheet D1 | Reflective polarizer R1 Prism sheet P1 Light diffusing sheet D1 |
| Light diffusing member | — | Light diffusing member 5 | Light diffusing member 9 | Light diffusing member 6 |
| Distance (a) between centers of linear light sources | mm | 50 | 50 | 50 |
| Distance (b) between the central position of the linear light source and the light incident plane | mm | 20 | 20 | 20 |
| (a)/(b) | — | 2.5 | 2.5 | 2.5 |
| Distance L between the central position of the linear light source and the central position of the image of the linear light source | mm | 11.0 | 14.1 | 5.8 |
| (a) × (¼) | — | 12.5 | 12.5 | 12.5 |
| (a) × (⅐) | — | 7.1 | 7.1 | 7.1 |
| Average luminance | cd/m² | 3314 | 3073 | 3328 |
| Front luminance uniformity ratio | % | 0.7 | 2.4 | 1.8 |

As shown in Table 6, it was found out that Example 6 had a sufficient luminance and capability to reduce luminance unevenness. On the contrary, it was found out that, although sufficient luminance was observed, Comparative Examples 11 and 12 were poor in occurence of luminance unevenness.

Example 7

The plastic case with the reflecting plate used in Example 1 was used. In the case, four cold cathode tubes having a diameter of 3.0 mm and the length of 360 mm were disposed so that the interval between the tubes and the bottom of this reflecting plate was 5 mm. The distance (a) between the centers of the cold cathode tubes was 50 mm. The tubes were secured at vicinity of the electrode section with a silicone sealant and an inverter was installed.

Subsequently, on the plastic case in which the cold cathode tubes had been installed, the light diffusing member 7 was disposed so that the flat plane surface thereof faced the cold cathode tubes. At that time, the position of the light diffusing member 7 was adjusted so that a distance (b) between the central position of the linear light source and the aforementioned flat plane (light incident plane) of the light diffusing member was 30.0 mm. Then, the light diffusing sheet D1, the prism sheet P1 and the reflective polarizer R1 were disposed in this order on the light outgoing plane of the light diffusing member 3. Further, a polarizing plate was installed on the reflective polarizer R1 to produce a direct-type backlight device.

The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 3 was 11.4 mm. This value satisfied the relationship of (a)/7<L<(a)/4 as the distance (a) between the centers of the linear light sources was 50 mm, (a)/7 was 7.1 mm and (a)/4 was 12.5 mm. The front luminance was 3,213 cd/m² and the luminance unevenness was 0.4%.

Comparative Example 13

A direct-type backlight device was produced in the same manner as in Example 7 except that the light diffusing member 7 was changed to the light diffusing member 5. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 2 was 16.1 mm. This value did not satisfy the relationship of (a)/7<L<(a)/4 as the distance (a) between the centers of the linear light sources was 50 mm, (a)/7 was 7.1 mm and (a)/4 was 12.5 mm. The front luminance was 3,218 cd/m² and the luminance unevenness was 2.0%.

Comparative Example 14

A direct-type backlight device was obtained in the same manner as in Example 7 except that the light diffusing member 7 was changed to the light diffusing member 8. This direct-type backlight device was evaluated in the same manner as in Example 1, and the distance L between the central position of one image corresponding to one linear light source and the position at which the center of the one linear light source was projected on the light outgoing plane of the light diffusing member was 5.1 mm. This value did not satisfy the relationship of (a)/7<L<(a)/4 as the distance (a) between the centers of the linear light sources was 50 mm, (a)/7 was 7.1 mm and (a)/4 was 12.5 mm. The front luminance was 3,257 cd/m² and the luminance unevenness was 1.7%.

The results in Examples 7 and Comparative Examples 13 and 14 are shown in Table 7.

TABLE 7

|  | unit | Ex. 7 | Comp. Ex. 13 | Comp. Ex. 14 |
| --- | --- | --- | --- | --- |
| Optical sheet | — | Reflective polarizer R1 Prism sheet P1 Light diffusing sheet D1 | Reflective polarizer R1 Prism sheet P1 Light diffusing sheet D1 | Reflective polarizer R1 Prism sheet P1 Light diffusing sheet D1 |
| Light diffusing member | — | Light diffusing member 7 | Light diffusing member 5 | Light diffusing member 8 |
| Distance (a) between centers of linear light sources | mm | 50 | 50 | 50 |
| Distance (b) between the central position of the linear light source and the light incident plane | mm | 30 | 30 | 30 |
| (a)/(b) | — | 1.7 | 1.7 | 1.7 |
| Distance L between the central position of the linear light source and the central position of the image of the linear light source | mm | 11.4 | 16.1 | 6.0 |
| (a) × (¼) | — | 12.5 | 12.5 | 12.5 |
| (a) × (⅐) | — | 7.1 | 7.1 | 7.1 |
| Average luminance | cd/m² | 3213 | 3218 | 3257 |
| Front luminance uniformity ratio | % | 0.4 | 2.0 | 1.7 |

As shown in Table 7, it was found out that Example 7 had a sufficient luminance and capability to reduce luminance unevenness. On the contrary, it was found out that, although sufficient luminance was observed, Comparative Examples 13 and 14 were poor in occurence of Luminance unevenness.

Example 8

The plastic case with the reflecting plate used in Example 1 was used. In the case, three cold cathode tubes having a diameter of 3.0 mm and the length of 360 mm were disposed so that the interval between the tubes and the bottom of this reflecting plate was 5 mm. The distance (a) between the centers of the cold cathode tubes was 60 mm. The tubes were secured at vicinity of the electrode section with a silicone sealant and an inverter was installed.

Subsequently, on the plastic case in which the cold cathode tubes had been installed, the light diffusing member 5 was disposed so that the flat plane surface thereof faced the cold cathode tubes. At that time, the position of the light diffusing member 5 was adjusted so that a distance (b) between the central position of the linear light source and the aforementioned flat plane (light incident plane) of the light diffusing member was 25.0 mm. Then, the light diffusing sheet D1, the prism sheet P1 and the reflective polarizer R1 were disposed in this order on the light outgoing plane of the light diffusing member 2. Further, a polarizing plate was installed on the reflective polarizer R1 to produce a direct-type backlight device.

The positions of the sprit images on this direct type backlight device were specified based on the luminance measurement in the same manner as the above, and the distance L between the central position of one image corresponding to one linear light source and the position at which the center of the one linear light source was projected on the light outgoing plane of the light diffusing member 3 was 13.6 mm. This value satisfied the relationship of (a)/7<L<(a)/4 as the distance (a) between the centers of the linear light sources was 60 mm, (a)/7 was 8.6 mm and (a)/4 was 15.0 mm. The front luminance was 2,708 cd/m² and the luminance unevenness was 0.6%.

Comparative Example 15

A direct-type backlight device was produced in the same manner as in Example 8 except that the light diffusing member 5 was changed to the light diffusing member 9. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 3 was 17.5 mm. This value did not satisfy the relationship of (a)/7<L<(a)/4 as the distance (a) between the centers of the linear light sources was 60 mm, (a)/7 was 8.6 mm and (a)/4 was 15.0 mm. The front luminance was 2,625 cd/m² and the luminance unevenness was 2.4%.

Comparative Example 16

A direct-type backlight device was produced in the same manner as in Example 8 except that the light diffusing member 5 was changed to the light diffusing member 6. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 6 was 7.2 mm. This value did not satisfy the relationship of $(a)/7<L<(a)/4$ as the distance (a) between the centers of the linear light sources was 60 mm, $(a)/7$ was 8.6 mm and $(a)/4$ was 15.0 mm. The front luminance was 2,693 $cd/m^2$ and the luminance unevenness was 2.1%.

The results in Examples 8 and Comparative Examples 15 and 16 are shown in Table 8.

TABLE 8

|  | unit | Ex. 8 | Comp. Ex. 15 | Comp. Ex. 16 |
|---|---|---|---|---|
| Optical sheet | — | Reflective polarizer R1 Prism sheet P1 Light diffusing sheet D1 | Reflective polarizer R1 Prism sheet P1 Light diffusing sheet D1 | Reflective polarizer R1 Prism sheet P1 Light diffusing sheet D1 |
| Light diffusing member | — | Light diffusing member 5 | Light diffusing member 9 | Light diffusing member 6 |
| Distance (a) between centers of linear light sources | mm | 60 | 60 | 60 |
| Distance (b) between the central position of the linear light source and the light incident plane | mm | 25 | 25 | 25 |
| (a)/(b) | — | 2.4 | 2.4 | 2.4 |
| Distance L between the central position of the linear light source and the central position of the image of the linear light source | mm | 13.6 | 17.5 | 7.2 |
| (a) × (¼) | — | 15.0 | 15.0 | 15.0 |
| (a) × (⅐) | — | 8.6 | 8.6 | 8.6 |
| Average luminance | $cd/m^2$ | 2708 | 2625 | 2693 |
| Front luminance uniformity ratio | % | 0.6 | 2.4 | 2.1 |

As shown in Table 8, it was found out that Example 8 had a sufficient luminance and capability to reduce luminance unevenness. On the contrary, it was found out that, although sufficient luminance was observed, Comparative Examples 15 and 16 were poor in occurence of luminance unevenness.

Example 9

The plastic case with the reflecting plate used in Example 1 was used. In this case, six cold cathode tubes having the diameter of 3.0 mm and the length of 360 mm were disposed so that the interval between the tubes and the bottom of this reflecting plate was 5 mm. The distance (a) between the centers of the cold cathode tubes was 34 mm. The tubes were secured at vicinity of the electrode section with a silicone sealant and an inverter was installed.

Subsequently, the prism sheet P2 was disposed on one surface of the light diffusing plate X to produce a light diffusing member. Then, on the plastic case in which the cold cathode tubes had been installed, the light diffusing member was disposed so that the back surface of the light diffusing plate X (flat plane) faced the cold cathode tubes. At that time, the position of the light diffusing member X was adjusted so that a distance (b) between the central position of the linear light source and the aforementioned flat plane (light incident plane) of the light diffusing member was 15.0 mm. Then, the prism sheet P1 and a light diffusing sheet D2 ("PBS072" supplied from Keiwa Inc.) were disposed in this order on the light outgoing plane of the prism sheet P2. Further, a polarizing plate was installed on this light diffusing sheet D2 to produce a direct-type backlight device.

The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 3 was 8.1 mm. This value satisfied the relationship of $(a)/7<L<(a)/4$ as the distance (a) between the centers of the linear light sources was 34 mm, $(a)/7$ was 4.9 mm and $(a)/4$ was 8.5 mm. The front luminance was 7,917 $cd/m^2$ and the luminance unevenness was 0.9%.

Comparative Example 17

A direct-type backlight device was produced in the same manner as in Example 9 except that the prism sheet P2 was changed to the prism sheet P3. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 9.7 mm. This value did not satisfy the relationship of $(a)/7<L<(a)/4$ as the distance (a) between the centers of the linear light sources was 34 mm, $(a)/7$ was 4.9 mm and $(a)/4$ was 8.5 mm. The front luminance was 7,745 $cd/m^2$ and the luminance unevenness was 2.7%.

Comparative Example 18

A direct-type backlight device was produced in the same manner as in Example 9 except that the prism sheet P2 was changed to the prism sheet P4. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 4.0 mm. This value did not satisfy the relationship of $(a)/7<L<(a)/4$ as the distance (a) between the centers of the linear light sources was 34 mm, $(a)/7$ was 4.9 mm and $(a)/4$ was 8.5 mm. The front luminance was 7,192 $cd/m^2$ and the luminance unevenness was 4.1%.

The results in Examples 9 and Comparative Examples 17 and 18 are shown in Table 9.

TABLE 9

|  | unit | Ex. 9 | Comp. Ex. 17 | Comp. Ex. 18 |
|---|---|---|---|---|
| Optical sheet | — | Light diffusing sheet D2 | Light diffusing sheet D2 | Light diffusing sheet D2 |

TABLE 9-continued

| | unit | Ex. 9 | Comp. Ex. 17 | Comp. Ex. 18 |
|---|---|---|---|---|
| Light diffusing member | — | Prism sheet P1 Prism sheet P2 Light diffusing plate X | Prism sheet P1 Prism sheet P3 Light diffusing plate X | Prism sheet P1 Prism sheet P4 Light diffusing plate X |
| Distance (a) between centers of linear light sources | mm | 34 | 34 | 34 |
| Distance (b) between the central position of the linear light source and the light incident plane | mm | 15 | 15 | 15 |
| (a)/(b) | — | 2.3 | 2.3 | 2.3 |
| Distance L between the central position of the linear light source and the central position of the image of the linear light source | mm | 8.1 | 9.7 | 4.0 |
| (a) × (¼) | — | 8.5 | 8.5 | 8.5 |
| (a) × (⅐) | — | 4.9 | 4.9 | 4.9 |
| Average luminance | cd/m² | 7917 | 7745 | 7192 |
| Front luminance uniformity ratio | % | 0.9 | 2.7 | 4.1 |

As shown in Table 9, it was found out that Example 9 had a sufficient luminance and capability to reduce luminance unevenness. On the contrary, it was found out that, although sufficient luminance was observed, Comparative Examples 17 and 18 were poor in occurence of luminance unevenness.

Example 10

The plastic case with the reflecting plate used in Example 1 was used. In this case, five cold cathode tubes having the diameter of 3.0 mm and the length of 360 mm were disposed so that the interval between the tubes and the bottom of this reflecting plate was 5 mm. The distance (a) between the centers of the cold cathode tubes was 40 mm. The tubes were secured at vicinity of the electrode section with a silicone sealant and an inverter was installed.

Subsequently, the prism sheet P3 was disposed on one surface of the light diffusing plate X to produce a light diffusing member. Then, on the plastic case in which the cold cathode tubes had been installed, the light diffusing member was disposed so that the back surface of the light diffusing plate X (flat plane) faced the cold cathode tubes. At that time, the position of the light diffusing member X was adjusted so that a distance (b) between the central position of the linear light source and the aforementioned flat plane (light incident plane) of the light diffusing member was 15.0 mm. Then, the prism sheet P1 and the light diffusing sheet D2 were disposed in this order on the light outgoing plane of the prism sheet P3. Further, a polarizing plate was installed on this light diffusing sheet D2 to produce a direct-type backlight device.

The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 9.7 mm. This value satisfied the relationship of (a)/7<L<(a)/4 as the distance (a) between the centers of the linear light sources was 40 mm, (a)/7 was 5.7 mm and (a)/4 was 10.0 mm. The front luminance was 5,088 cd/m² and the luminance unevenness was 1.2%.

Comparative Example 19

A direct-type backlight device was produced in the same manner as in Example 10 except that the prism sheet P3 was changed to the prism sheet P5. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 13.9 mm. This value did not satisfy the relationship of (a)/7<L<(a)/4 as the distance (a) between the centers of the linear light sources was 40 mm, (a)/7 was 5.7 mm and (a)/4 was 10 mm. The front luminance was 4,823 cd/m² and the luminance unevenness was 3.2%.

Comparative Example 20

A direct-type backlight device was produced in the same manner as in Example 10 except that the prism sheet P3 was changed to the prism sheet P6. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 4.6 mm. This value did not satisfy the relationship of (a)/7<L<(a)/4 as the distance (a) between the centers of the linear light sources was 40 mm, (a)/7 was 5.7 mm and (a)/4 was 10 mm. The front luminance was 5,020 cd/m² and the luminance unevenness was 2.7%.

The results in Examples 10 and Comparative Examples 19 and 20 are shown in Table 10.

TABLE 10

| | unit | Ex. 10 | Comp. Ex. 19 | Comp. Ex. 20 |
|---|---|---|---|---|
| Optical sheet | — | Light diffusing sheet D2 | Light diffusing sheet D2 | Light diffusing sheet D2 |
| Light diffusing member | — | Prism sheet P1 Prism sheet P3 Light diffusing plate X | Prism sheet P1 Prism sheet P5 Light diffusing plate X | Prism sheet P1 Prism sheet P6 Light diffusing plate X |
| Distance (a) between centers of linear light sources | mm | 40 | 40 | 40 |
| Distance (b) between the central position of the linear light source and the light incident plane | mm | 15 | 15 | 15 |
| (a)/(b) | — | 2.7 | 2.7 | 2.7 |
| Distance L between the central position of the linear light source and the central position of the image of the linear light source | mm | 9.7 | 13.9 | 4.6 |
| (a) × (¼) | — | 10 | 10 | 10 |
| (a) × (⅐) | — | 5.7 | 5.7 | 5.7 |
| Average luminance | cd/m² | 5088 | 4823 | 5020 |
| Front luminance uniformity ratio | % | 1.2 | 3.2 | 2.7 |

As shown in Table 10, it was found out that Example 10 had a sufficient luminance and capability to reduce luminance unevenness. On the contrary, it was found out that, although sufficient luminance was observed, Comparative Examples 19 and 20 were poor in occurence of luminance unevenness.

Example 11

A direct-type backlight device was produced in the same manner as in Example 10 except that two pieces of the light diffusing sheet D1 were used in place of the light diffusing sheet D2. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 3 was 9.7 mm. This value satisfied the relationship of $(a)/7<L<(a)/4$ as the distance (a) between the centers of the linear light sources was 40 mm, (a)/7 was 5.7 mm and (a)/4 was 10 mm. The front luminance was 3,538 $cd/m^2$ and the luminance unevenness was 1.1%.

Comparative Example 21

A direct-type backlight device was produced in the same manner as in Example 11 except that the prism sheet P3 was changed to the prism sheet P5. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 13.9 mm, This value did not satisfy the relationship of $(a)/7<L<(a)/4$ as the distance (a) between the centers of the linear light sources was 40 mm, (a)/7 was 5.7 mm and (a)/4 was 10 mm. The front luminance was 3,434 $cd/m^2$ and the luminance unevenness was 2.9%.

Comparative Example 22

A direct-type backlight device was produced in the same manner as in Example 11 except that the prism sheet P3 was changed to the prism sheet P6. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 4.6 mm. This value did not satisfy the relationship of $(a)/7<L<(a)/4$ as the distance (a) between the centers of the linear light sources was 40 mm, (a)/7 was 5.7 mm and (a)/4 was 10 mm. The front luminance was 3,556 $cd/m^2$ and the luminance unevenness was 2.3%.

The results in Examples 11 and Comparative Examples 21 and 22 are shown in Table 11.

TABLE 11

| | unit | Ex. 11 | Comp. Ex. 21 | Comp. Ex. 22 |
|---|---|---|---|---|
| Optical sheet | — | Light diffusing sheet D1 Light diffusing sheet D1 Light | Light diffusing sheet D1 Light diffusing sheet D1 Light | Light diffusing sheet D1 Light diffusing sheet D1 Light |
| Light diffusing member | — | diffusing sheet D1 Prism sheet P3 Light diffusing plate X | diffusing sheet D1 Prism sheet P5 Light diffusing plate X | diffusing sheet D1 Prism sheet P6 Light diffusing plate X |
| Distance (a) between centers of linear light sources | mm | 40 | 40 | 40 |
| Distance (b) between the central position of the linear light source and the light incident plane | mm | 15 | 15 | 15 |
| (a)/(b) | — | 2.7 | 2.7 | 2.7 |
| Distance L between the central position of the linear light source and the central position of the image of the linear light source | mm | 9.7 | 13.9 | 4.6 |
| (a) × (¼) | — | 10 | 10 | 10 |
| (a) × (⅐) | — | 5.7 | 5.7 | 5.7 |
| Average luminance | $cd/m^2$ | 3538 | 3434 | 3556 |
| Front luminance uniformity ratio | % | 1.1 | 2.9 | 2.3 |

As shown in Table 11, it was found out that Example 11 had a sufficient luminance and capability to reduce luminance unevenness. On the contrary, it was found out that, although sufficient luminance was observed, Comparative Examples 21 and 22 were poor in occurence of luminance unevenness.

Example 12

The plastic case with the reflecting plate used in Example 1 was used. In this case, four cold cathode tubes having the diameter of 3.0 mm and the length of 360 mm were disposed so that the interval between the tubes and the bottom of this reflecting plate was 5 mm. The distance (a) between the centers of the cold cathode tubes was 50 mm. The tubes were secured at vicinity of the electrode section with a silicone sealant and an inverter was installed.

Subsequently, the prism sheet P7 was disposed on one surface of the light diffusing plate X to produce a light diffusing member. Then, on the plastic case in which the cold cathode tubes had been installed, the light diffusing member was disposed so that the back surface of the light diffusing plate X (flat plane) faced the cold cathode tubes. At that time, the position of the light diffusing member X was adjusted so that a distance (b) between the central position of the linear light source and the aforementioned flat plane (light incident plane) of the light diffusing member was 20.0 mm, Then, the prism sheet P1 and the light diffusing sheet D2 were disposed in this order on the light outgoing plane of the prism sheet P4. Further, a polarizing plate was installed on this light diffusing sheet D2 to produce a direct-type backlight device.

The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 3 was 11.6 mm. This value satisfied the relationship of $(a)/7<L<(a)/4$ as the distance (a) between the centers of the linear light sources was 50 mm, (a)/7 was 7.1 mm and (a)/4 was 12.5 mm. The front luminance was 3,773 cd/m² and the luminance unevenness was 0.7%.

Comparative Example 23

A direct-type backlight device was produced in the same manner as in Example 12 except that the prism sheet P7 was changed to the prism sheet P8. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 15.1 mm. This value did not satisfy the relationship of (a)/7<L<(a)/4 as the distance (a) between the centers of the linear light sources was 50 mm, (a)/7 was 7.1 mm and (a)/4 was 12.5 mm. The front luminance was 3,729 cd/m² and the luminance unevenness was 2.4%.

Comparative Example 24

A direct-type backlight device was produced in the same manner as in Example 12 except that the prism sheet P7 was changed to the prism sheet P9. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 5.3 mm. This value did not satisfy the relationship of (a)/7<L<(a)/4 as the distance (a) between the centers of the linear light sources was 50 mm, (a)/7 was 7.1 mm and (a)/4 was 12.5 mm. The front luminance was 3,742 cd/m² and the luminance unevenness was 3.4%.

The results in Examples 12 and Comparative Examples 23 and 24 are shown in Table 12.

TABLE 12

| | unit | Ex. 12 | Comp. Ex. 23 | Comp. Ex. 24 |
|---|---|---|---|---|
| Optical sheet | — | Light diffusing sheet D2 Prism sheet P1 | Light diffusing sheet D2 Prism sheet P1 | Light diffusing sheet D2 Prism sheet P1 |
| Light diffusing member | — | Prism sheet P7 Light diffusing plate X | Prism sheet P8 Light diffusing plate X | Prism sheet P9 Light diffusing plate X |
| Distance (a) between centers of linear light sources | mm | 50 | 50 | 50 |
| Distance (b) between the central position of the linear light source and the light incident plane | mm | 20 | 20 | 20 |
| (a)/(b) | — | 2.5 | 2.5 | 2.5 |
| Distance L between the central position of the linear light source and the central position of the image of the linear light source | mm | 11.6 | 15.1 | 5.3 |
| (a) × (¼) | | 12.5 | 12.5 | 12.5 |
| (a) × (⅐) | | 7.1 | 7.1 | 7.1 |
| Average luminance | cd/m² | 3773 | 3729 | 3742 |
| Front luminance uniformity ratio | % | 0.7 | 2.4 | 3.4 |

As shown in Table 12, it was found out that Example 12 had a sufficient luminance and capability to reduce luminance unevenness. On the contrary, it was found out that, although sufficient luminance was observed, Comparative Examples 23 and 24 were poor in occurence of luminance unevenness.

Example 13

A direct-type backlight device was produced in the same as in Example 12 except that three cold cathode tubes were used, the distance (a) between the centers of the cold cathode tubes was 60 mm and the distance (b) between the central position of the linear light source and the flat plane surface (light incident plane) of the light diffusing member was 25.0 mm. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member 3 was 14.3 mm. This value satisfied the relationship of (a)/7<L<(a)/4 as the distance (a) between the centers of the linear light sources was 60 mm, (a)/7 was 8.6 mm and (a)/4 was 15.0 mm. The front luminance was 3,120 cd/m² and the luminance unevenness was 0.8%.

Comparative Example 25

A direct-type backlight device was produced in the same manner as in Example 13 except that the prism sheet P7 was changed to the prism sheet P5. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 22.3 mm. This value did not satisfy the relationship of (a)/7<L<(a)/4 as the distance (a) between the centers of the linear light sources was 60 mm, (a)/7 was 8.6 mm and (a)/4 was 15.0 mm. The front luminance was 3,034 cd/m² and the luminance unevenness was 2.6%.

Comparative Example 26

A direct-type backlight device was produced in the same manner as in Example 13 except that the prism sheet P7 was changed to the prism sheet P9. The positions of the sprit images on this direct-type backlight device were specified based on the luminance measurement in the same manner as the above, and the distance L between the central position of one image corresponding to one linear light source and the position at which the center of the one linear light source was projected on the light outgoing plane of the light diffusing member was 6.5 mm. This value did not satisfy the relationship of (a)/7<L<(a)/4 as the distance (a) between the centers of the linear light sources was 60 mm, (a)/7 was 8.6 mm and (a)/4 was 15.0 mm. The front luminance was 3,089 cd/m² and the luminance unevenness was 2.8%.

The results in Examples 13 and Comparative Examples 25 and 26 are shown in Table 13.

TABLE 13

| | unit | Ex. 13 | Comp. Ex. 25 | Comp. Ex. 26 |
|---|---|---|---|---|
| Optical sheet | — | Light diffusing sheet D2 Prism sheet P1 | Light diffusing sheet D2 Prism sheet P1 | Light diffusing sheet D2 Prism sheet P1 |
| Light diffusing member | — | Prism sheet P7 Light diffusing plate X | Prism sheet P5 Light diffusing plate X | Prism sheet P9 Light diffusing plate X |
| Distance (a) between centers of linear light sources | mm | 60 | 60 | 60 |
| Distance (b) between the central position of the linear light source and the light incident plane | mm | 25 | 25 | 25 |
| (a)/(b) | — | 2.4 | 2.4 | 2.4 |
| Distance L between the central position of the linear light source and the central position of the image of the linear light source | mm | 14.3 | 22.3 | 6.5 |
| (a) × (¼) | — | 15.0 | 15.0 | 15.0 |
| (a) × (½) | — | 8.6 | 8.6 | 8.6 |
| Average luminance | cd/m² | 3120 | 3034 | 3089 |
| Front luminance uniformity ratio | % | 0.8 | 2.6 | 2.8 |

As shown in Table 13, it was found out that Example 13 had a sufficient luminance and capability to reduce luminance unevenness. On the contrary, it was found out that, although sufficient luminance was observed, Comparative Examples 25 and 26 were poor in occurence of luminance unevenness.

The invention claimed is:

1. A direct-type backlight device comprising:
   a plurality of linear light sources disposed in approximately parallel,
   a reflecting plate having a flat plane surface which reflects light from the linear light sources and
   a platy light diffusing member receiving, diffusing and emitting direct light from said linear light sources and reflected light from said reflecting plate,
   wherein a distance (a) between centers of the adjacent linear light sources of said plurality of linear light sources is 30 to 65 mm,
   wherein said light diffusing member comprises an approximately flat light incident plane on a surface facing said linear light sources and a light outgoing plane having a prism row of a plurality of aligned linear prisms extending in approximately parallel to a longitudinal direction of said linear light sources,
   wherein said linear prism has two inclined surfaces having an approximately equal tilt angle against a plane which is perpendicular to a thickness direction of the light diffusing member, and a cross sectional shape of the linear prism in a crosswise direction is a triangle, and
   wherein a relationship of $(a)/7 < L < (a)/4$ is satisfied wherein L is a distance (mm) between a central position of one image of two images on said light outgoing plane both corresponding to one linear light source among said plurality of linear light sources, and a position at which a center of said one linear light source is projected on said light outgoing plane.

2. The direct-type backlight device according to claim 1 wherein a relationship of $1 < (a)/(b) < 3$ is satisfied wherein (b) is a distance (mm) between the central position of said linear light source and said light incident plane.

3. The direct-type backlight device according to claim 1 wherein the cross sectional shape in its crosswise direction of said linear prism is an isosceles triangle.

4. The direct-type backlight device according to claim 1 wherein said light diffusing member is integrally molded.

5. The direct-type backlight device according to claim 1 wherein:
   said light diffusing member comprises a light diffusing plate having approximately flat front and back surfaces and a prism sheet disposed on the front surface of this light diffusing plate, said prism sheet having said prism row formed on a surface opposite to a surface facing said front surface of said light diffusing plate,
   said light incident plane is the back surface of said light diffusing plate, and
   said light outgoing plane is the surface of said prism sheet on which said prism row is formed.

6. The direct-type backlight device according to claim 5 wherein said light diffusing plate has a total light transmittance of 75% or more.

* * * * *